United States Patent
Masten, Jr.

(10) Patent No.: US 11,045,781 B2
(45) Date of Patent: Jun. 29, 2021

(54) METHOD AND APPARATUS FOR DISRUPTION OF SOLID MATERIALS IN A FLUID MEDIUM

(71) Applicant: James William Masten, Jr., Everett, WA (US)

(72) Inventor: James William Masten, Jr., Everett, WA (US)

( * ) Notice: Subject to any disclaimer, the term of this patent is extended or adjusted under 35 U.S.C. 154(b) by 0 days.

(21) Appl. No.: 17/017,073

(22) Filed: Sep. 10, 2020

(65) Prior Publication Data

US 2021/0069663 A1    Mar. 11, 2021

Related U.S. Application Data

(60) Provisional application No. 62/898,488, filed on Sep. 10, 2019.

(51) Int. Cl.
| | |
|---|---|
| *B01J 19/10* | (2006.01) |
| *H04R 17/10* | (2006.01) |
| *B06B 1/06* | (2006.01) |
| *B01J 19/00* | (2006.01) |

(52) U.S. Cl.
CPC ............ *B01J 19/008* (2013.01); *B01J 19/10* (2013.01); *B06B 1/0633* (2013.01); *B06B 1/0655* (2013.01); *H04R 17/10* (2013.01)

(58) Field of Classification Search
None
See application file for complete search history.

(56) References Cited

U.S. PATENT DOCUMENTS

| | | | | | |
|---|---|---|---|---|---|
| 4,156,824 | A | * | 5/1979 | Pence, Jr. | H04R 17/10 310/312 |
| 5,717,181 | A | * | 2/1998 | Colgate | C10G 15/00 204/157.15 |
| 7,141,912 | B2 | * | 11/2006 | Ikeda | H01L 41/094 310/321 |
| 7,210,354 | B2 | * | 5/2007 | Puskas | B01J 19/10 73/590 |
| 2011/0227659 | A1 | * | 9/2011 | Tanaya | H03H 9/0514 331/156 |

* cited by examiner

*Primary Examiner* — Jennifer A Leung

(57) ABSTRACT

An apparatus for disrupting solid materials suspended in a fluid medium includes a plurality of hammer elements that transfer acoustic energy from an acoustic transducer into a concentration zone between heads of the hammer elements and inner walls of a fluid duct which act as an anvil, thereby causing cavitations to form within the concentration zone. The transducer may be a cylindrical transducer compression fit into an acoustic projector from which the hammer elements extend towards a distal end, and mass balance elements extend towards a proximal end. The apparatus can be used to efficiently extract juice from fruit pulp, separate oils from plant matter, and process various organic and inorganic materials.

19 Claims, 8 Drawing Sheets

SECTION E-E

METHOD AND APPARATUS FOR DISRUPTION OF SOLID MATERIALS IN A FLUID MEDIUM

RELATED APPLICATION

This application claims priority to U.S. Provisional Application No. 62/898,488, filed Sep. 10, 2019, the contents of which are incorporated herein by reference in their entirety.

BACKGROUND

There is a plurality of processes using various methods and apparatuses to aid in the extraction of fluidic materials from hydrocarbon cellular structures. Such systems typically involve one or more staged processes involving shredding, crushing, compressing, solvent reduction and over-pressures or under-pressures. Even after processing, the moisture content of typical processed hydrocarbon waste is greater than 50%. Over the last 50 years, several different acoustic processes have been employed to release or relax the physical mechanisms within the hydrocarbon cellular structures that act to contain or channel the fluidic materials which are the subject of the extraction process.

Conventional acoustically driven devices lack a uniform, large surface area and high efficiency of energy transfer to the hydrocarbon cellular structures, especially at high power levels. Typical of the state of the practice, acoustic driver mechanical extensions (e.g., a plate, a lever or a piston) have an uneven or non-uniform energy transfer interface between the active element and the acoustically conductive medium.

BRIEF SUMMARY

Embodiments of the present disclosure are directed to a method and apparatus for an effective and efficient coupling of acoustic energy-driven cavitation phenomena into cellular structures of hydrocarbon materials, fracturing the fluid-containing cellular structures and liberating fluids contained in the cellular structures.

Embodiments may incorporate a relatively low-cost piezoelectric cylindrical element that is mechanically enhanced to amplify the range of physical motion and increase the surface area of contact with an acoustic medium. One embodiment includes a circular system of spring bar-mounted metal hammers, forming an annulus which operates against a cylindrical anvil that traps hydrocarbon material as it passes through an interstitial space formed by the hammers and the anvil.

In an embodiment, an apparatus for disrupting solid materials in a fluid medium includes a cylindrical fluid duct, a fluid inlet disposed on a first end of the fluid duct, a fluid outlet disposed on a second end of the fluid duct, a cylindrical acoustic projector concentric with the fluid duct and disposed inside the fluid duct, the acoustic projector having a plurality of hammer elements spaced apart from one another by a first plurality of slots in the acoustic projector, and an acoustic transducer coupled to the acoustic projector.

In an embodiment, an apparatus for causing cavitations within a fluid medium includes a cylindrical fluid duct, a fluid inlet disposed on a first end of the fluid duct, a fluid outlet disposed on a second end of the fluid duct, a cylindrical acoustic projector concentric with the fluid duct and disposed inside the fluid duct, the acoustic projector comprising a plurality of hammer elements spaced apart from one another by a first plurality of slots that extend from a distal end of the acoustic projector, a second plurality of slots that extend from a proximal end of the acoustic projector and partially overlap with the first plurality of slots, and a cylindrical acoustic transducer compression fit into the acoustic projector and disposed in a portion of the acoustic projector where the first plurality of slots overlap with the second plurality of slots.

BRIEF DESCRIPTION OF THE DRAWINGS

The foregoing aspects and many of the attendant advantages of this disclosure will become more readily appreciated by reference to the following detailed descriptions, when taken in conjunction with the accompanying drawings, wherein.

DETAILED DESCRIPTION

The following list provides a number of specific descriptions and examples of components that are present in the figures. The descriptions in the list are illustrative of specific embodiments, and should not be construed as limiting the scope of this disclosure.

| Item # | Description |
| --- | --- |
| 1 | Acoustic transducer |
| 2 | A portion of spring tangs bar-mounted as hammers |
| 3 | Hammer-anvil flow gap or interstitial space |
| 4 | "Anvil" region of flow duct |

-continued

| Item # | Description |
|---|---|
| 5 | Cylindrical acoustic amplifier comprising an array of tang-hammer components 2 and mass balance elements 12 |
| 6 | Heating/cooling flow ducts |
| 7 | Temperature monitoring sensor |
| 8 | Compression band |
| 10 | Polymer acoustic element shell |
| 12 | Mass balance elements |
| 14 | Freedom gap to isolate individual hammers 2 |
| 15 | Freedom gap to isolate individual mass balance elements 12 |
| 17 | Mechanical retention access port |
| 18 | Electrical connection screw mount |
| 20 | Input flow duct |
| 22 | Output flow duct |
| 30 | Acoustic isolation shield of an anvil |
| 50 | Connector to supply AC power to acoustic radiant element |
| 70 | Acoustic refractory hydrocarbon material duct |
| 80 | Head of hammer 2 |
| 82 | Transition between head and arm of hammer 2 |
| 84 | Arm of hammer 2 |
| 86 | Concentration zone between head of hammer 2 and anvil 4 |
| 88 | Cavitation |
| 132 | Flow meter reporting rate of hydrocarbon material in-flow 20 |
| 134 | Flow meter reporting rate of hydrocarbon material out-flow 22 |
| 140 | Heating fluid or coolant fluid lines |
| 150 | O-ring seal groove |
| 160 | Mechanical retention groove |
| 170 | Anvil acoustic energy sensor |
| 180 | Mechanical/Electrical support duct |
| 300 | AC signal lead wire to drive a first side of piezoelectric device 1 |
| 310 | AC signal lead wire connecting to conductive material of mechanical amplifier to drive a second side of piezoelectric device |

A detailed description of embodiments is provided below along with accompanying figures. The scope of this disclosure is limited only by the claims and encompasses numerous alternatives, modifications and equivalents. Although steps of various processes are presented in a particular order, embodiments are not necessarily limited to being performed in the listed order. In some embodiments, certain operations may be performed simultaneously, in an order other than the described order, or not performed at all.

Numerous specific details are set forth in the following description to provide a thorough understanding. These details are provided for the purpose of example and embodiments may be practiced according to the claims without some or all of these specific details. For the sake of clarity, technical material that is known in the technical fields related to this disclosure has not been described in detail so that the disclosure is not unnecessarily obscured.

Embodiments of the present disclosure are directed to the delivery of mechanically amplified acoustical energy to drive a cylindrical hammer-anvil system to fracture cellular structures of hydrocarbon material or otherwise disrupt solid materials suspended in a fluid medium pumped through interstitial annular spaces between a hammer and anvil system, and an associated apparatus. Embodiments of the present disclosure may be used to efficiently extract oils and juices from the cellular structures of hydrocarbon materials which may include fruits, herbs, vegetables, animal products, animal or human biological waste or other hydrocarbon materials containing cellular or fluidic tubular structures. However, the scope of the present disclosure is not limited to these specific applications—in other embodiments, a system may be adapted to disrupt inorganic structures. For example, embodiments may be used to remove contamination or corrosion from metal materials, or to separate minerals from soil or other contamination.

The embodiment shown in the figures targets materials that have been preprocessed, usually by production facilities transforming raw fruit, vegetable or hydrocarbon waste to some other form. Example processing includes the making of wine, fruit juice, diced tomatoes or even human or animal sewer sludge. Many of such processes produce waste streams that are more than 50% moisture, despite size reduction and extremely high compression-force processes designed to extract the moisture from the solids. The typically applied liquid extraction processes are limited by the restriction to not fracture the non-compliant structures, such as the seeds or stems that may be mixed in the process flow. The cost of the extraction of the seeds and stems from the bulk may be the factor that defines the flow as waste.

Even though fracturing the seeds or stems may potentially release materials that would contaminate the bulk waste in traditional large-force processes, reducing the value of the flow, an embodiment of the present disclosure is tolerant of included hydrocarbon non-compliant solid materials that may be contained within the flow. This apparatus can be designed to a scale directly related to the nature of the specific materials to be processed. For sewer sludge, the system can be designed to tolerate grains of sand while effectively fracturing micro-biological organisms. For grapes and cannabis, the system can be designed to tolerate seeds and stems of a typical maximum diameter of 6 mm while effectively fracturing sub-millimeter cellular structures. For larger pitted fruits such as peaches, the system could be designed to tolerate peach pits while effectively liberating the peach juices from the pulp of the peach.

To be effective, the entities to be acoustically processed must be thoroughly saturated with an acoustically transmissive solvent liquid. Candidate solvent liquids include solvents with density times speed-of-sound products that range between 0.5 and 2.0 times the speed of sound in water.

Stems are easily saturated by the solvent liquid and thus are good acoustic conductors. Stems and such non-compliant materials may also contain significant plant liquid that will be released by the pressure/relaxation cycles of acoustic cavitations. The fresh seeds of most crops contain significant moisture content and are thus good acoustic conductors. Although most seeds will not fracture under the stress of acoustic cavitations, they are not impediments to the acoustic conduction process.

Figure 3A:
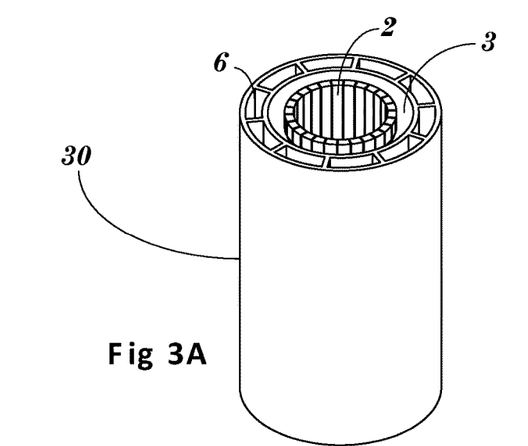
FIG. 3A is a top ¾ view of a mechanical extension fitted inside an anvil housing, which also provides thermal management fluid flow channels.
Figure 3B:
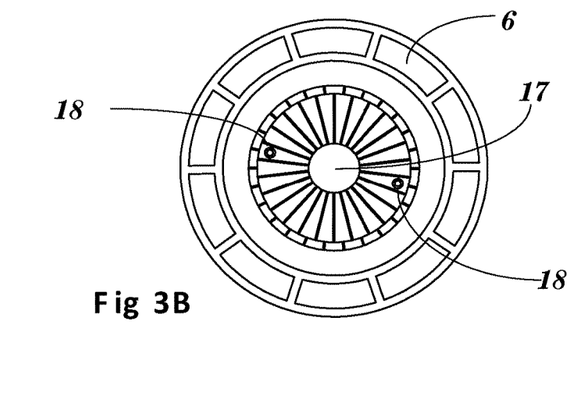
FIG. 3B is a bottom view of an assembled sub-system with a mechanically amplified, piezoelectric-driven energy projector, fitted inside a tubular system that functions as the material flow duct and the anvil energy impact system.
Figure 3C:
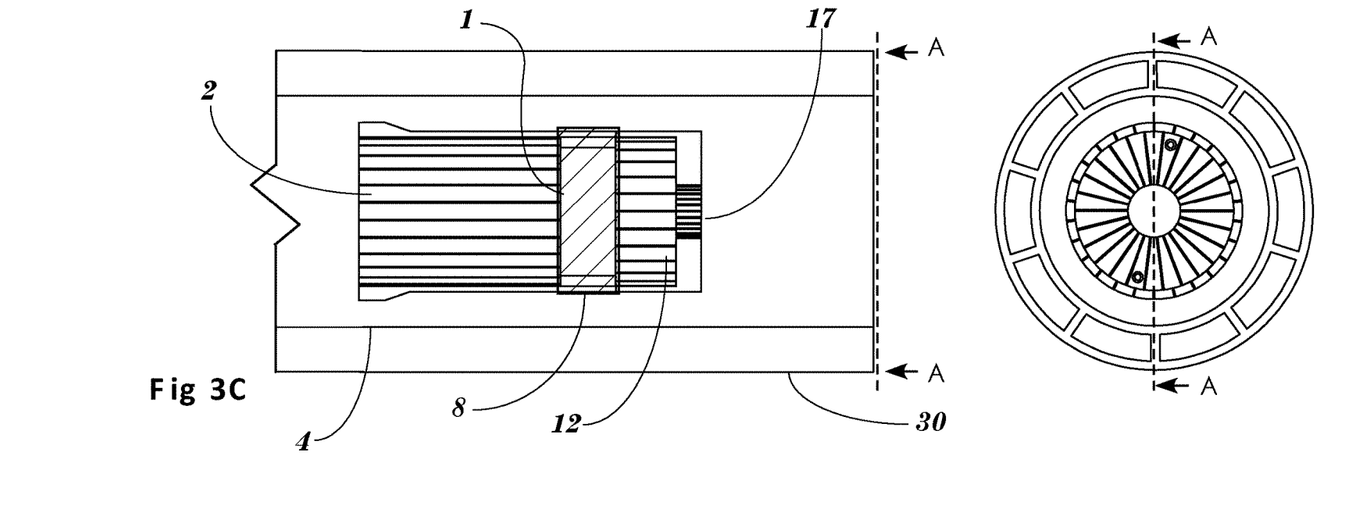
FIG. 3C is a side-view of a cut across the bottom of a mechanical extension fitted inside an anvil as a component part of a tubular housing supporting thermal management ducts 6.
Figures 4A, 4B:
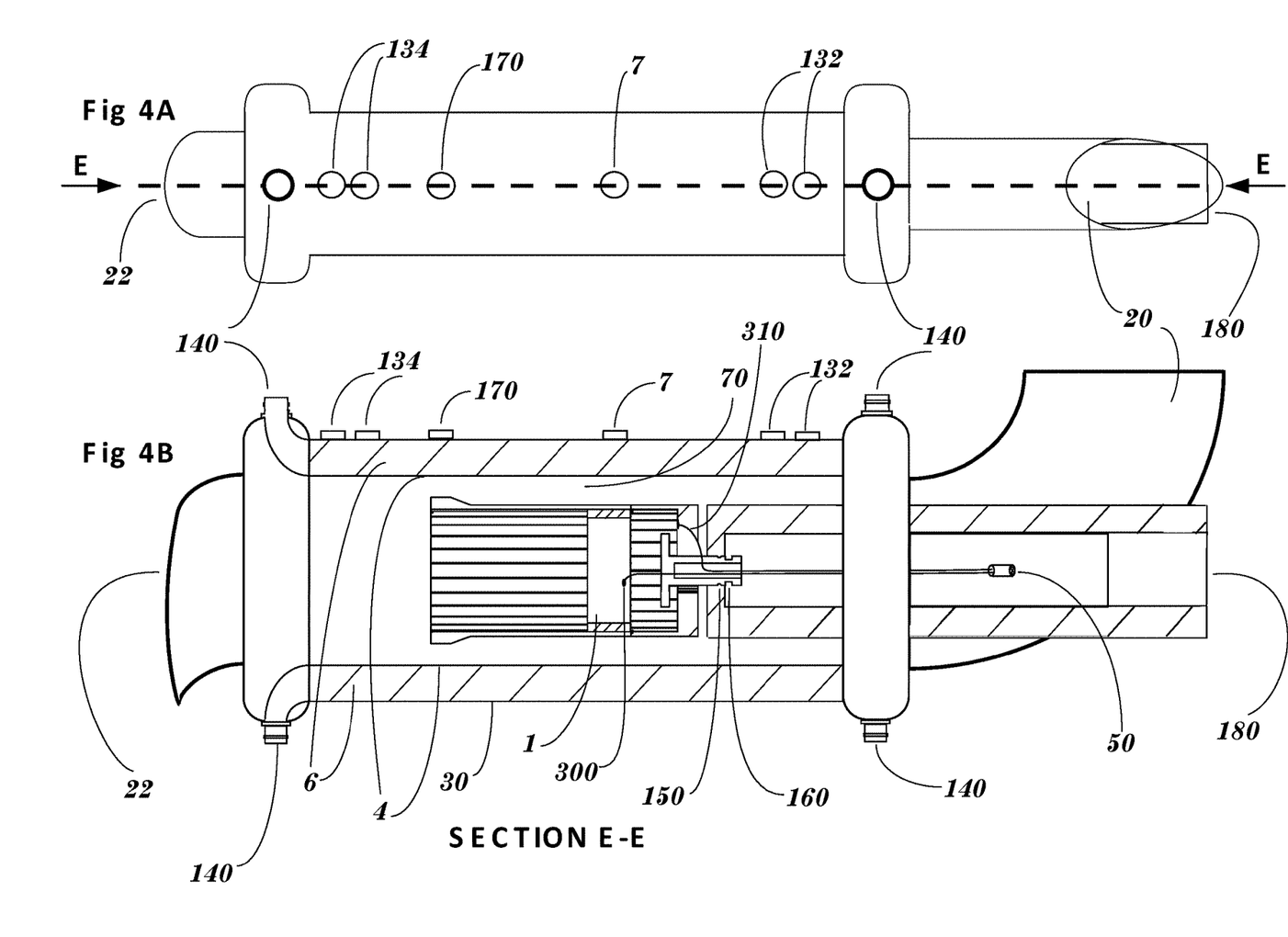
FIG. 4A is a top view of an outer tube housing of a thermal management duct showing the cut line for a side view.
FIG. 4B is a cut-away side-view of an embodiment of an outer tube housing of a thermal management duct showing an integrated cellular disrupter system within.

FIGS. 1A and 1B and FIGS. 2A, 2B and 2C depict general exterior and interior views of one embodiment of the physical structure of the hydrocarbon material cellular disruptor energy projector apparatus. FIGS. 3A, 3B and 3C present the sub-system of an energy projector inserted within a flow channel and energy-reflecting anvil portion of a flow material duct. FIG. 4B is a cut-away of the full sub-system (shown in FIG. 4A) presented within the context of the fully assembled flow duct, assembled sensors and an electrical drive energy distribution system.

Figures 1A, 1B:
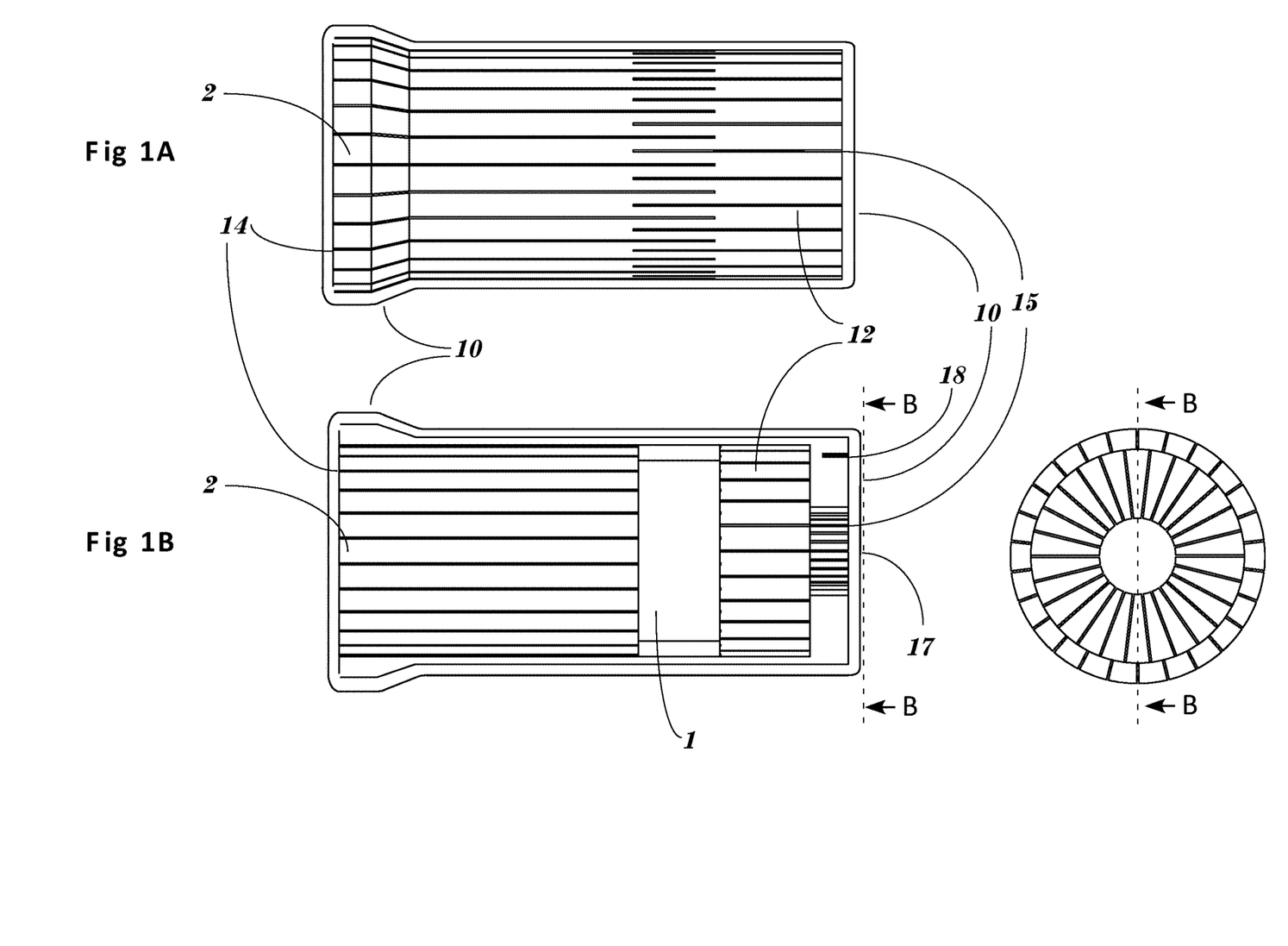
FIG. 1A is an exterior side-view of a mechanical extension to a piezoelectric acoustic driver.
FIG. 1B is a cut-away along a cut line across the bottom of a mechanical extension revealing a side-view of an embodiment of a mechanical extension to a piezoelectric acoustic device with a piezoelectric device shown inside the mechanical extension.
Figure 2A:
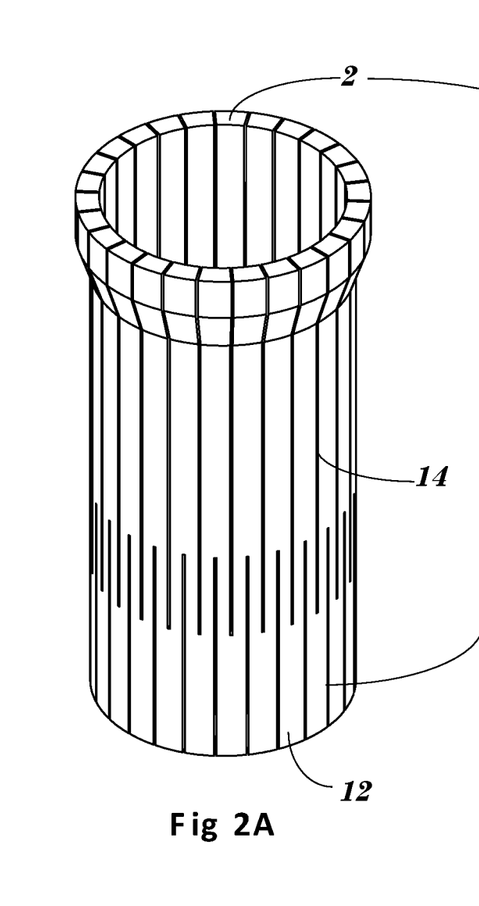
FIG. 2A is a top ¾ view of a mechanical extension fitted around a piezoelectric acoustic device.
Figure 2B:
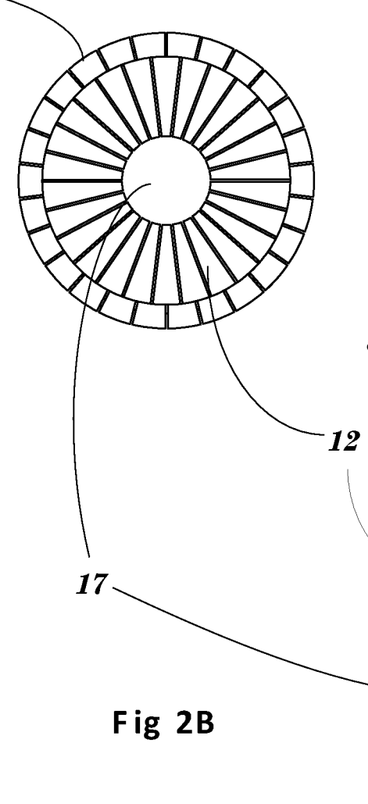
FIG. 2B is a view illustrating a bottom surface of a mechanical extension device.
Figure 2C:
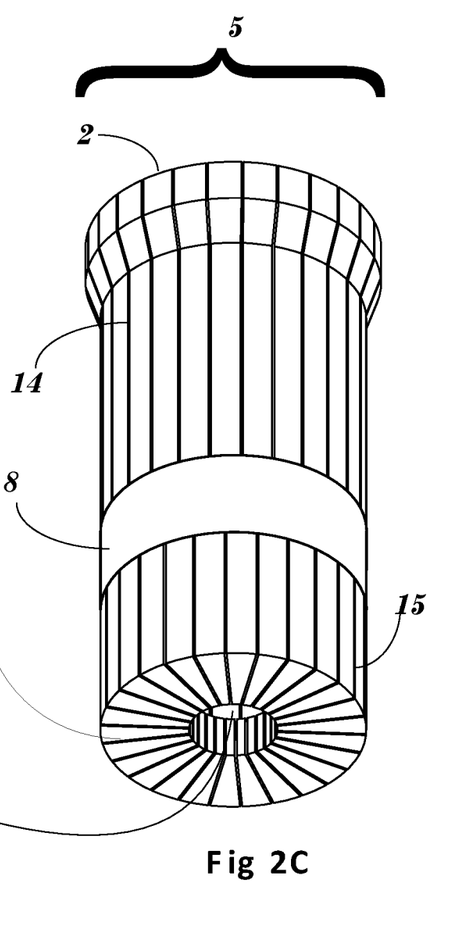
FIG. 2C is a bottom ¾ view of a mechanical extension fitted around a piezoelectric acoustic device.

FIGS. 1A/1B and FIGS. 2A/2B/2C reveal the novel design and construction of mechanical extensions to the acoustic transducer 1 configured as hammer elements 2, mass balance elements 12, anvil 4 and acoustic isolation barrier 30 for this apparatus. Although subsequent description refers to the acoustic transducer 1 as a piezoelectric transducer, other types of transducers such as magnetostrictive transducers are within the scope of this disclosure. The structure of the hammer elements 2 is intended to enable each hammer to move in a radial direction independent of the other hammer elements.

Hammers 2 may be cut from a single cylinder 5 of material such that each hammer shares a root to a portion of the cylinder compressing the transducer element 1 with two mass balance elements 12 on the opposite end of the cylinder. For example, hammers 2 and mass balance elements 12 may be separated by kerf cuts made in a cylindrical material. Each mass balance element 12 also shares the opposite end of the acoustic amplifier 5 with two hammers. Freedom gaps or slots 14, 15 may be constructed to be as narrow as technically possible, maximizing the surface area and the mass of the hammer and mass balance elements.

Hammer elements 2 may be machined to flexibility by removing materials along their length and creating a hammerhead shape to provide mass on the end of the flexible stock with the intention of lowering the natural frequency of the resulting structure. Mass balance elements 12 have a terminating mass on the end of a shorter stock that may be several times the mass of the hammers. The mass-lever arm products of the hammers 2 and the mass balance elements 12 may be about the same, e.g. within 5% of one another. In particular, the hammers 2 and mass balance elements 12 may be configured to equalize vibrational velocity between the hammers and balance elements and prevent harmonics. Variables affecting the mass-lever arm products include mass, length, stiffness, and distribution of mass. The resulting system uses the minimal motion of the mass balance elements 5 to return energy and assist the maximum motion of the hammers 2.

In the embodiment described by the following description, the target materials are grape pomace or cannabis flowers. Both of these plant materials have similarly sized stems and seeds associated with the collected materials, which typically exhibit a maximum of 6 mm in diameter for both the seeds and the stems. Stem length can exceed 20 mm but rarely exceed that value. Examination of the plant materials reveals that the soft fruit waste or flowers are nominally a maximum diameter of about 20 mm. Thus the interstitial gap between the hammers 2 and the anvil 4 is set to 23 mm. This selection drives the design of the cellular disrupter. The selection is not arbitrary but is instead a function of the physical properties of the material which is to be subjected to the process of using acoustic energy to liberate the encapsulated juices and oils trapped in the cellular structures of the hydrocarbon material. However, it should be recognized that these values may be adapted to process different materials in other embodiments.

This selected piezoelectric cylinder for one specific embodiment has an outer diameter of 84 mm, a length of 32 mm and a natural resonant frequency of 14 kHz. The mechanical amplifier will load the piezoelectric cylinder in the radial mode, reducing its natural resonant frequency to approximately 6 kHz but with a bandwidth of nearly 6 kHz. The speed of sound for the acoustically transmissive solvents will be in the range of 1,000 meters per second to about 1,500 meters per second, generating expected wavelengths between 111 mm and 500 mm. Operating in the near-field uses an acoustic propagation path significantly less than 2 wavelengths. For this system, a maximum acoustic propagation length of 2 cycles over the given bandwidth would yield a path length between 222 mm and 1,000 mm, depending on the solvent present in the acoustic path. The interstitial distance of 20 mm ranges between 4% and 18% of a wavelength. These design principles may be applied to different types of materials and solvent media to appropriately size the transducer 1, cylinder 5, and channel 3 to deliver near-field acoustic energy.

The following description is in the context of an embodiment comprising a piezoelectric acoustic driver 1, a mechanical extension to the acoustic radiant emitter driver configured as a cylindrical array of hammers 2, and a restricted-flow interstitial annular channel 3 between the acoustically driven hammers and the duct wall as a fixed anvil 4. The combined system is intended to uniquely transfer acoustic energy from the configured piezoelectric acoustic driver 1 through the mechanical extension hammer 2 to deliver extreme pressure, shock and impact to the passing hydrocarbon materials in the restricted channel 3 as the materials pass between the mechanical extension of the hammers and the physical proximity of the anvil 4.

Figure 8:
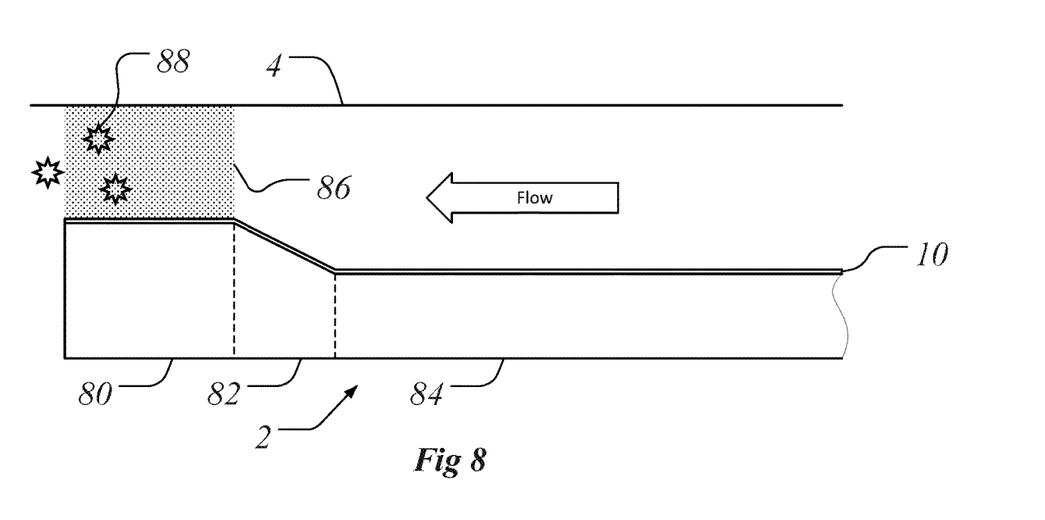
FIG. 8 illustrates a hammer causing cavitation.

In more detail, referring to FIG. 8, each hammer 2 comprises a head region 80 having a first thickness, an arm region 84 having a second thickness that is less than the first thickness, and a transition region 82 that transitions between the first thickness and the second thickness. Because the first thickness is greater than the second thickness, the mass of the head region 80 per unit length is greater than the mass of the arm region 84, so that a larger mass portion is disposed at the distal end of each hammer 2. Fluid is pressurized in concentration zone 86, and cavitations 88 may occur within the concentration zone and an area distal to the cavitation zone in which fluid pressure drops as the area available to the flow increases.

The acoustic structure including the piezoelectric driver 1 and the mechanical amplification fixture 5 are acoustically isolated from the physical structure that includes the anvil 4 by a compliant polymer coating 10, an O-ring (not shown) within an O-ring groove 150, a mechanical retention C-clip (not shown) within a mechanical retention C-clip groove 160. These components are assembled through the mechanical access port 17. The concentration zone 86 may be monitored by a sensor 170 embedded in the anvil 4, which can accurately measure the energy of the hammer system 2 as detected at the anvil 4. In an embodiment, sensor 170 may be a transducer, and more than one type of sensor 170 be present, e.g. a transducer and an accelerometer or a thermocouple. A control system (not shown) comprising one or more computing component, e.g. a processor, input, display, input device, control logic, computer readable medium, etc., can adjust the frequency and the power of the excitation energy provided to a piezoelectric acoustic driver 1 such that the energy striking anvil 4 is at a desired level, indicating that an effective population of cavitations are propagating in the interstitial volume 3 between hammer 2 and anvil 4. This may be a dynamic adjustment to accommodate the variations of the speed of sound in a hydrocarbon-enriched liquid acoustic medium which is impacted by the blend of natural plant liquids and the acoustically conductive liquid solvent used to saturate the hydrocarbon materials. This acoustically conductive liquid may be ethyl alcohol and/or water, although is some cases a different solvent such as a petroleum solvent may be used.

The basic apparatus disclosed herein is not intended to be limited to a specific type of hydrocarbon material, and in fact could be used to mechanically release trapped liquid from cellular structures of many types of hydrocarbon-rich materials, or to dissociate various organic or inorganic structures. The control system may dynamically adapt the operating frequency and the power of the excitation energy to changes in the acoustic impedance as the constituent components of the acoustically transmissive fluid change through the dilution of the extracted liquids into the acoustically transmissive solvent and the makeup of specific batches of material.

The hammers 2 and the mass balance elements 12, are components of a mechanical amplifier 5 created using a cylinder that has been cut into segments parallel to the longitudinal axis of the piezoelectric acoustic element 1. The inner diameter of the mechanical structure 5 is such that a tight compression fit on the piezoelectric cylinder 1 holds the piezoelectric element in compression and provides continuous electrical continuity to the mechanical amplifier 5 when the element is driven electrically through electrical connections 300, which is soldered directly to the inner side of the piezoelectric element 1, and 310, which is mechanically connected to the conductive mechanical amplifier 5.

Depending on the Young's Modulus of the material selected for the mechanical structure 5, additional compression loading may be provided. The acoustic transducer 1 may be disposed in an area in which slots 14 overlap with slots 15, and mechanically compressed in that region by a compression band 8 fitted around an outer diameter of the mechanical amplifier 5. The compression band 8 cooperates with the overlapping slots to provide a higher degree of compression than would be present if the compression band was not disposed over the overlapping slots. In some embodiments, a mechanical bond between the acoustic element 1 and the mechanical amplifier 5 may be provided by an adhesive or solder material.

This mechanical structure 5 is pressed onto the piezoelectric acoustic driver element 1 to hold the piezoelectric element in compression during operation and to provide a very high degree of acoustic coupling between the acoustic driver 1 and the mechanical structure 5. Mechanical acoustic coupling is ensured because the mechanical structure 5 extends across the full length of the cylindrical piezoelectric acoustic driver 1. A tight interference fit between the transducer 1 and the mechanical amplifier 5 is facilitated by the Freedom Gaps of the hammers 14 and the Freedom Gaps of the mass balance elements 15 which interleave to provide a relatively high degree of expansion so that the piezoelectric driver element 1 is tightly compressed by an interference fit to mechanical amplifier 5. These gaps may be relatively thin, on the order of 0.062" (1.57 mm) or less, and the exact thickness may result from the machining techniques used for the materials selected. The mechanical amplifier 5 may comprise any material having a speed of sound characteristic that is on the order of 5 times the speed of sound in water or greater. Harder materials having a higher speed of sound are difficult to machine to fine tolerances over such lengths as would be typical for the intended applications. In various embodiments, the mechanical amplifier 5 may comprise a metal material such as titanium, spring steel, stainless steel or beryllium copper, a composite material, or a polymer material such as an acrylic or polyamide material, etc.

The resulting system is coated with a compliant, elastic material 10, which serves two purposes. First, physically, the coating ensures that no hydrocarbon material is allowed to get between the tangs 2 or mass balance elements 12 to reduce their independent radial motion. Accordingly, the elastic material 10 may fill the slots 14 and 15 that separate the hammers 2 and the mass balance elements 12. Second, the coating acts as an impedance matching interface to the acoustically conductive medium which enhances the acoustic coupling between the mechanical extension 5 to the piezoelectric acoustic driver 1 and the structures that contain the anvil 4. The anvil may comprise a metal material such as a stainless steel or aluminum material, or a composite or polymer material. The surface of anvil 4 may be coated with a coating that enhances one or both of hardness and thermal conductivity. For example, the anvil 4 may be coated with a ceramic or diamond layer by a vapor deposition process. The elastic material 10 may include, for example, a polymer such as a urethane material or a block copolymer such as a polyether block amide material. The elastic material 10 may be applied to the mechanical amplifier 5 by a dip or spray coating process.

As depicted in FIG. 3C and FIG. 4B, the cylindrical mechanical amplifier 5 which includes tangs or hammers 2 and mass balance elements 12 is mounted within a duct cylinder 4 that acts as the anvil for the hammers and provides a flow chamber of the annular conduit 3 for the flow of the hydrocarbon materials. The hydrocarbon materials are pumped by a solid materials pump (not shown) that forces the hydrocarbon materials through the restriction that is an interstitial annular gap 3 between the hammers and the anvil system. This annular gap 3 between the mechanical amplifier 5 and the flow duct 70 guides the flow of the preprocessed hydrocarbon materials between the hammers 2 and the anvil 4 to experience cavitations which cause the liquids trapped within the cellular structures of the hydrocarbon materials to be mechanically released. The outer duct wall may be heated or cooled by temperature-controlled fluid flowing within the double walls of the outer duct 6.

Additionally a thermistor, a K, R or S thermocouple or similar temperature sensor 7, is mounted in the duct 6 such that the sensor can monitor the temperature of the heating/cooling flow within the jacket of the duct 6.

The performance of the novel mechanically amplified acoustic projectors 5 is significant for coupling large disruptive forces to the hydrocarbon cellular material. A transducer element 1 typically comprises highly inelastic materials. For example, piezoelectric transducers use an inelastic ceramic layer. The inelasticity of the transducer material limits the extent to which the transducer can deform, or translate electrical energy into acoustic vibrations. When a transducer is coupled to the acoustic amplifiers 5 which comprise a more elastic material than the transducer, the hammers vibrate at a greater amplitude than an uncoupled transducer, thereby providing amplification of the acoustic output. Furthermore, embodiments of the present disclosure include a concentric cylindrical configuration between the amplifier 5 and the anvil 4 in which acoustic energy manifests uniformly around the diameter of the amplifier, so that all materials passing through the apparatus experience the same level of disruptive acoustic energy as they pass between the hammers and the anvil.

In an embodiment, the plastic-encased 10 cylinder of hammers 2 and mass balance elements 12 projects into the flow of the hydrocarbon mass and solvent liquid, causing a restriction between heads 80 and the anvil 4 at the hammer-anvil interstice 3 depicted as concentration zone 86 in FIG. 8. The reduced flow area in concentration zone 86 causes a pressure increase which enables the hydrocarbon/liquid medium to receive more energy from the increasing pressure wave from the motion of the driven hammers 2 resulting in a more violent bubble collapse on the decreasing pressure wave. This feature allows significantly increased effectiveness of the energy coupling from the piezoelectric acoustic driver 1, through the mechanical amplifier 5 to the liquid medium which contains the hydrocarbon material and solvent. The material enters the apparatus through the input flow duct 20, moves through the duct 70 and exits the apparatus through the output flow duct 22.

The mechanical enhancement 2, 12 to the piezoelectric acoustic driver 1 provides a large uniform and symmetrical increase in the contact area of the piezoelectric acoustic driver 1 and a mechanism for significantly increasing the effective pressure at the hydrocarbon/liquid acoustic driver interface 3.

The embodiment of an apparatus presented in this disclosure reveals a physical implementation of a mechanically amplified piezoelectric acoustic driver 1 that is dynamically "tuned" according to the ratio of speed of sound in the acoustic medium to its density comprising the hydrocarbon material and a transport solvent liquid in duct 70. The system is tuned by adjusting the frequency and the power of the electrical signal that is driving the piezoelectric element 1 at the core of the mechanical amplifier. The manual, open loop or automated closed loop tuning of the wavelength and amplitude of the emitted acoustic energy significantly optimizes the effectiveness of the system's ability to fracture the hydrocarbon micro-cellular structures and release the contained core liquid materials.

This "near field" acoustic system is not intended to transmit or propagate coherent acoustic energy over a large distance as a communications medium. Typical near-field acoustic systems are incoherent and operate in less than two wavelengths of total propagation length. Accordingly, embodiments of the present application may concentrate acoustic energy into a fluid medium in a gap between a hammer and an anvil that is less than two wavelengths of the sound waves that are projected into that area between the hammer and the anvil. Such an embodiment maximizes the effective coupling of the near-field destructive forces of cavitation in a symmetrical and uniform manner, such that all of the passing material is exposed to the same process at the same energy levels.

Many embodiments of control computer systems, embedded or remote, could be programmed to effectively read the amplitude of the cavitations energy sensor 170, relate the detections to the operations process using an adaptive algorithm which varies the frequency and then the transmitted power of the applied electrical energy. This system will adapt by measuring the speed of sound through the flow as a way of establishing the highest frequency permissible as the frequency allowing just less than 2 wavelengths to propagate in the interstitial gap. The optimum frequency is found by sweeping the frequency down the range of operating frequencies, starting from the measured maximum frequency, while monitoring the effective energy level to be received through the conductive medium at the anvil 4.

A conventional embedded computer control system has been developed specifically to enable commercial and industrial processes which would benefit from this embedded mechanically enhanced acoustic radiant energy-driven cavitation device. This embedded control system is optimized for the precise control of high performance acoustic cavitation destruction of fine grain hydrocarbon structures.

Figure 5:
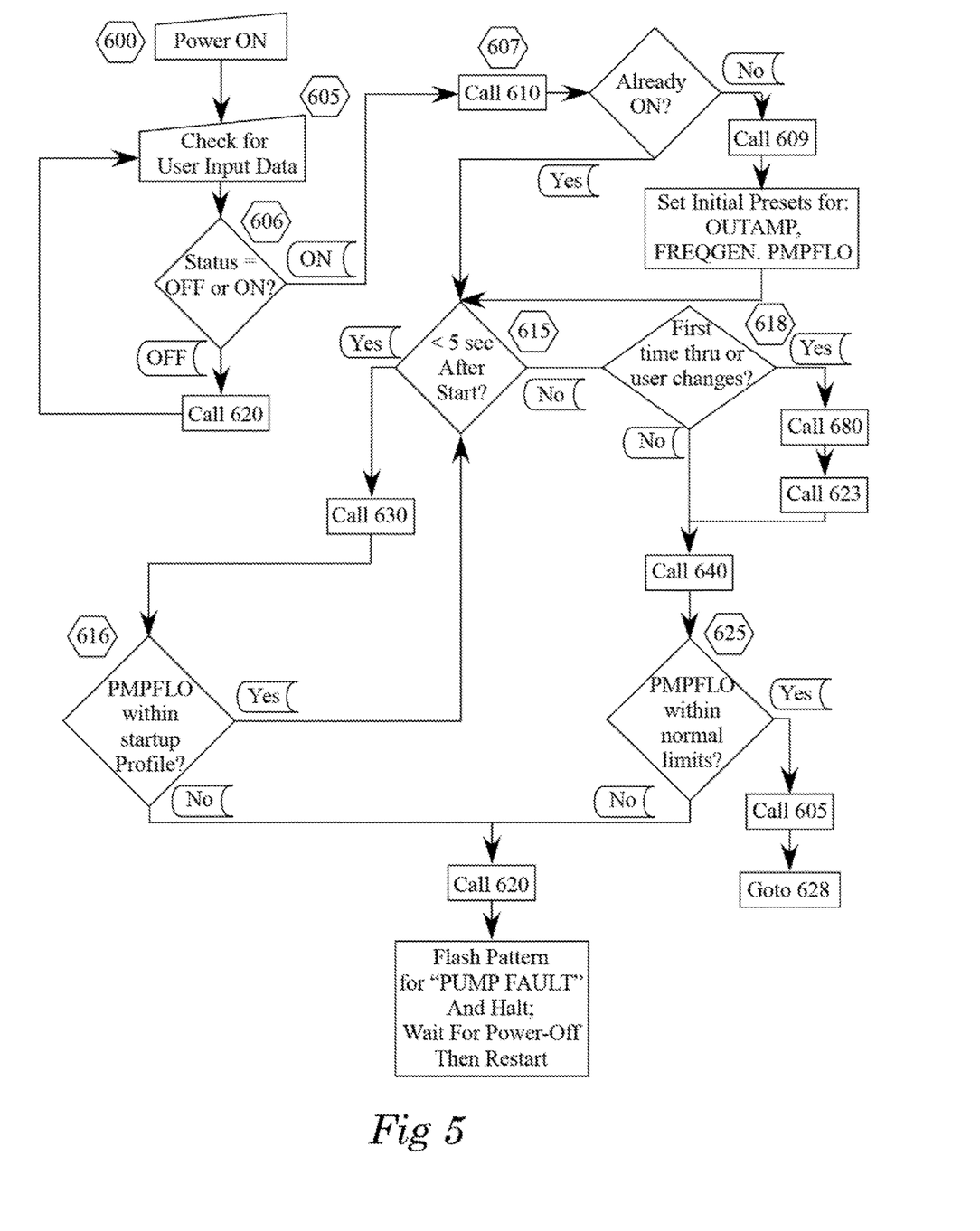
FIG. 5 illustrates embodiments of a method of operating an automatically adapting cellular disrupter.
Figure 6:
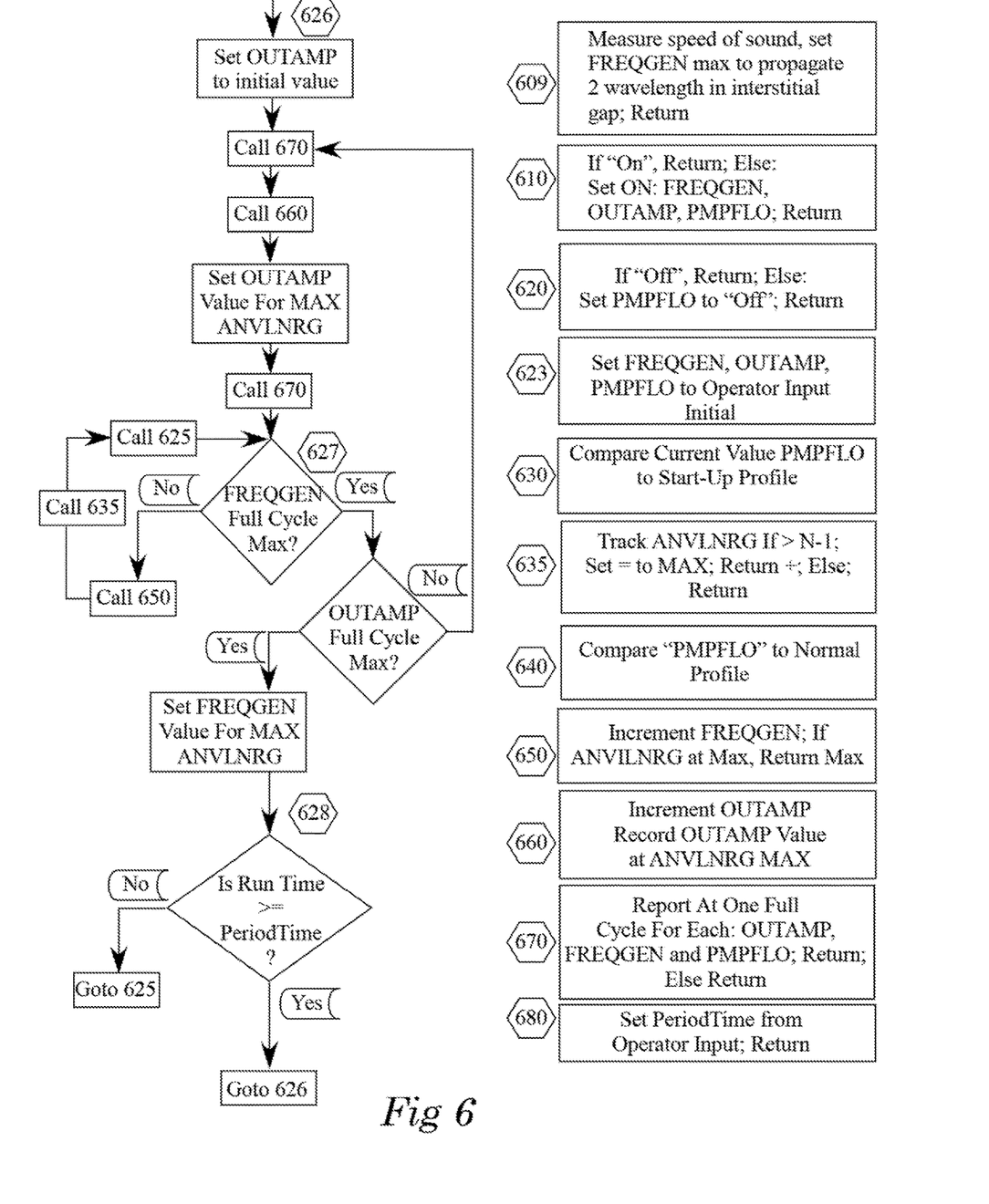
FIG. 6 illustrates embodiments of a method of operating an automatically adapting cellular disrupter.

The following process 600 is an embodiment of a control process describing control logic for delivering optimal destructive acoustic energy to a plant cellular reduction process as a component of a hydrocarbon fluid extraction system. It should be understood that process 600 is merely an example, and other embodiments are possible. In addition, the process 600 is not limited to the specific embodiments of an apparatus described above As illustrated in FIG. 4B, AC power from an acoustic signal-generating device is applied to connector 50 which supplies waveform power to leads 300 and 310 to drive the transducer element 1. As shown in FIG. 5, power is applied to the three controlled sub-systems when the operator switches the power on at control point 602.

Control point 602 may include activating a mechanical power switch. When the switch 600 is on, the control system first checks for user input data 605. In FIG. 5, processes 605 and 606 constantly monitor the user input settings on the control panel of the appliance. When process 606 detects a change to "On", process 607 is called to manage the user command. Process 610 is called to power the three subsystems under control, OUTAMP, FREQGEN and PMPFLO.

Processes 615 and 616 force and manage the startup profile of the hydrocarbon material pump using the PMPFLO control module for the first 5 seconds of operation. After the initial 5 second pump start up period, control passes to module 618. 618 checks for user changes using processes 623 for operator inputs setting initial operating points for OUTAMP, FREQGEN and PMPFLO and process 680 for run-time period. These set points allow for a specific startup frequency and power output profile to operate if these parameters have been preset. If there is no preset operation, the system will automatically search for an optimum frequency and power setting using processes 635, 626 and 627.

The automated search profile will sweep the frequency band within a programmable number of seconds, pausing automatically to accommodate a time period for stabilization of the acoustic cavitations. If run-time is within a predefined startup period, Process 630 is called to monitor the startup profile of the pump for over current and under RPM startup issues.

Automated frequency searching begins with a process to measure the speed of sound in the flow 609. If there are no operator input initial values, then a set of startup default values is hard coded into this subroutine.

At a maximum energy measurement, as detected by process 635, the amplitude 626 is held constant while process 627 is selected to sweep the frequency transmitted by the acoustic emitter while the cavitations energy detecting sensor 170 monitors the energy that reaches the anvil. When an optimum operating point is found, the corresponding frequency and transmitted power level are held for the "period time" by process 628.

After the "period time" timer has run down, the frequency optimization search begins again at process 626 and the search for an optimum power output is performed by an iterative combination of processes 626 and 627. This loop continues along with constant monitoring of the pump for operating issues and the input terminal for operator commands.

Figure 7:
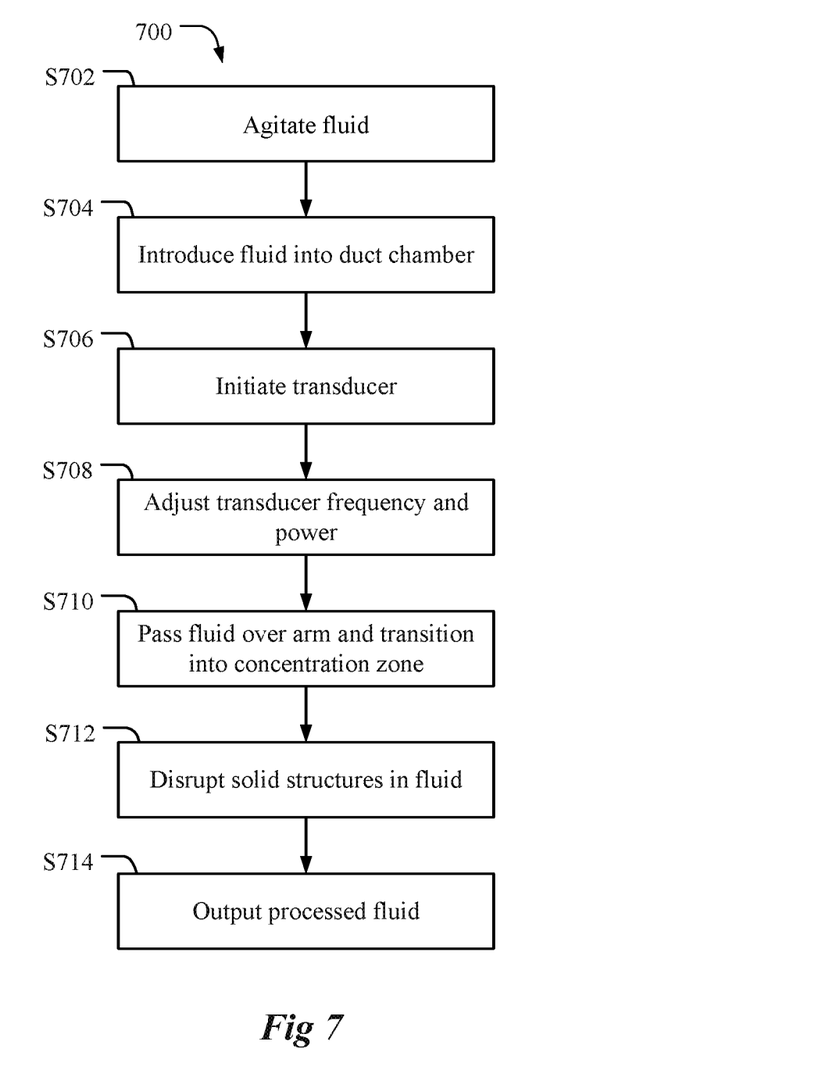
FIG. 7 illustrates an embodiment of a method for disrupting solid materials in a fluid medium

Next, an embodiment of a process 700 for disruption of solid materials in a fluid medium will be described with reference to FIG. 7.

Many hydrocarbon materials are products of a mechanical process that reduces the hydrocarbon to a sludge or minced liquid/solid. Some hydrocarbon candidates for liquid extraction are whole bodied and would require some preprocessing to a sludge or minced liquid/solid to be efficiently processed. Starting with a fluid medium comprising a solvent and solids, which may have been preprocessed as indicated above, the fluid medium may be mechanically agitated at S702. The mechanical agitation may be applied to the input mix to thoroughly expose the sludge or minced liquid/solid material to the solvent so that the flow is thoroughly saturated with solvent, or to provide homogeneity to the fluid (e.g. to prevent solids from sinking to the bottom of a fluid vessel).

The fluid is introduced to input flow duct 20 at S704. In an embodiment, the fluid input is controlled using input flow meter 132 to monitor the flow rate. In some embodiments, S704 optionally includes introducing a solvent to flush and fill the system with fluid before introducing a fluid bearing solid materials.

Power is provided to the transducer by supplying electrical energy at a predetermined power and frequency at S706. The transducer may be initiated at a lower frequency and power, e.g. a half-power setting, compared to the frequency and power settings that will be used to optimally process the fluid. As the transducer is initiated, acoustic energy is transmitted to the acoustic amplifier 5 and causes the hammers 2 to vibrate a higher amplitude than the transducer. The frequency of the acoustic energy may be set so that the distance between the hammers 2 and the anvil 4 is less than two wavelengths when the hammers are at rest. Kinetic energy from the vibrating hammers transfers to the fluid through elastic layer 10 and reflects off the anvil 4. The reflections interact with acoustic waves from the hammer 2, causing cavitations 88 to appear in the fluid medium.

Transducer frequency and power are adjusted at S708. When optimal frequency and power settings are known, those settings may be applied. In such an embodiment, process 100 may still include regular monitoring of the fluid stream and adjustment of the frequency and power settings to provide optimal processing conditions. In an embodiment, frequency and power are varied, and the effects of those variables are measured by sensor 170. In some embodiments, such as fruit pulp processing, the frequency and power settings may be optimized to provide a maximum level energy received by sensor 170. However, in some other embodiments, maximum energy levels may damage solid structures making them difficult to filter out of the fluid, so optimum levels may be determined by an automated or manual inspection of the products present in the output stream.

In an embodiment, the transducer frequency is adjusted independently from the power to maximize disruption of the fluid. For example, a frequency sweep may be performed at a low power setting to determine a frequency that causes maximum disruption, and power may be increased at that frequency to determine whether received energy increases at higher power levels. If energy does increase with power, then a highest power setting may be used to provide maximum disruption.

Elements of process S708 may be repeated while fluid is being processed. In particular, the system may vary one or both of frequency and power to ensure that those parameters are providing optimal conditions. Regularly optimizing frequency and power may be especially useful when processing an inconsistent fluid composition or different batches of material.

Fluid is passed over the arm 84 of hammers 2, across transition element 82, and into concentration zone 86 between the head 80 of the hammer and the anvil 4. The fluid may be compressed in the concentration zone, thereby increasing the density of the fluid and improving its performance as an acoustic transmission medium. Solid materials in the fluid are exposed to localized energy bursts associated with the cavitations, which may disrupt solid structures within the fluid. For example, when the solid structures are cellular walls, the cellular walls may burst, releasing fluids contained within the cells. In another example, when the solid structures are oil nodules attached to flowers, the oil nodules may be separated from the plant matter making up the flowers. In addition, the oil nodules may be liquified by energy from the cavitations, allowing the oils to be more readily absorbed by a solvent in the fluid medium.

In a specific embodiment, the oil nodules are trichomes on cannabis flowers, and the solvent is an alcohol. In such an embodiment, fluid may be extracted from the flowers prior to processing, and the fluid including the alcohol solvent and the flowers may be cooled to 10 degrees Celsius or lower to embrittle the trichomes, thereby facilitating their separation from the plant matter. Other flowers that may be processed include lavender and rose flowers.

After it has been processed, the fluid containing the disrupted solid structures is output from output flow duct 22 to collect juices and solvents for separation in another process, e.g. filtration processes to remove stems and seeds from useful juices.

In an embodiment, the result of process 700 is the release of trapped organic liquids from hydrocarbon materials. After passing though the interstitial gap 3, the material's cellular structures will release their natural liquids and those liquids will be replaced with a solvent liquid. These solvent liquids may be removed from the hydrocarbon materials using a separate reduced-pressure cycle. As a result of the process, the bulk solvent liquids may contain, as a solution, the liquids formerly trapped inside the cellular structures of the hydrocarbon materials.

In an embodiment, a method of creating and controlling the acoustically driven cavitations in an organic hydrocarbon solid in a liquid flow in an iterative process comprises selecting a near optimal range of wavelengths for maximum creation of cavitations in a particular organic hydrocarbon solids liquid flow, measuring the magnitude of the transmitted energy through the flow to determine the optimum wavelength, selecting the near optimal amplitude of the transmitted wavelengths, measuring the magnitude of the transmitted energy through the flow to determine the optimum amplitude, and selecting a higher velocity flow rate of hydrocarbon solids in a liquid flow.

In another embodiment, an apparatus which employs a cylindrical acoustic energy projector to symmetrically and uniformly expand and extend the contact area to a liquid flow containing hydrocarbon solids comprises a cylindrical piezoelectric element press-fit into a cylindrical mechanical extension that is longer than the piezoelectric element said cylindrical piezoelectric element asymmetrically press-fit inside the longer cylindrical mechanical extension such that the piezoelectric element is located from 25% to 50% of the length of the cylindrical mechanical extension. In embodiments, the piezoelectric element is centered at a position that is from 25% to 45%, from 25 to 40%, or from 30 to 35% of length from the proximal (input) end of the mechanical extension.

The mechanical extension may have a series of longitudinal segments constructed by a plurality of cuts to the cylinder made parallel to the cylinder's long axis extending from the long end of the mechanical extension to the most distant end of the piezoelectric element and from the short end of the mechanical extension extending to the far end of the piezoelectric element, where the long and short segments are interleaved evenly spaced across the width of the piezoelectric element, the ends of the long mechanical extension segments being shaped to provide a striking surface towards the hydrocarbon solids in a fluid flow, the ends of the short mechanical extension segments being shaped to provide a counter-balancing mass to the mass of the long mechanical extension segments, and the striking surface of said mechanical extension segments being shaped to provide a restriction to the flow of hydrocarbon solids in a fluid.

In an embodiment, an apparatus to provide and enhance the effect of cavitations to disrupt or break fine-grain fluidic containment vessels of hydrocarbon materials comprises a cylindrical acoustically reflecting surface located within at most 2 wavelengths of the operating frequency of the transmitting system, the cylindrical acoustically reflecting surface shaped to provide a restriction to the flow of hydrocarbon solids in a fluid.

In one implementation, a method for disrupting a solid material in a fluid medium includes agitating the fluid medium, pumping the fluid medium into a cylindrical fluid duct, passing the fluid medium through an annular conduit that extends between a hammer element that is vibrating at a first frequency and a cylindrical anvil element that is positioned within two wavelengths of the first frequency and the hammer element to cause cavitations in the fluid medium. The cavitations may occur in a concentration zone between heads of the hammer elements and the anvil element, and the heads of the hammer elements may have a greater thickness than arms of the hammer elements. The caviations may further occur in a lower pressure zone immediately distal to the concentration zone.

The concentration zone may have a volume that is less than volumes of the flow path that are immediately distal and proximal to the concentration zone. A fluid pressure in the concentration zone may be higher than a fluid pressure in the flow path before and after the concentration zone.

The heads of the hammer elements may be disposed on a free end of the hammer elements, and the arms of the hammer elements may extend from a cylindrical body. In an embodiment, the hammer elements are separated from one another around the cylindrical body by a plurality of first slots, and the slots are filled with an elastic material. The method may include activating a cylindrical transducer that is compressed into an opening of the cylindrical body, and transferring acoustical energy to the cylindrical body to vibrate the hammer elements. In addition, the method may include transferring acoustical energy to a plurality of massbalance elements that are disposed on a proximal end of the cylindrical body and vibrating the mass-balance elements. The mass balance elements may be configured to have mass-lever arm products that are about the same as masslever arm products of the hammers, so that vibrating the mass-balance elements balances the vibrations of the hammer elements, thereby stabilizing the hammer elements and preventing harmonics from manifesting in the cylindrical body.

The method may further comprise initiating the transducer at a low energy level that is less than 50% or 25% or less of the maximum energy level of the transducer, changing a frequency of the transducer, and measuring an amount of acoustic energy present in the fluid medium by a sensor that measures energy experienced by the anvil. A controller may determine a first frequency of the transducer at which a maximum level of energy is experienced by the sensor, operate the transducer at the first frequency, and increase the energy level of the transducer. In an embodiment, the method includes periodically measuring energy at the transducer and adjusting its operating frequency. In an embodiment, all the fluid medium passes through the cylindrical concentration zone so that all of the fluid medium passing through the concentration zone experiences a consistent level of disruptive acoustic energy.

The method may further include removing the processed fluid medium from a processing chamber and filtering the processed fluid. In an embodiment, the solid material is fruit pulp, and disrupting the solid material includes disrupting cellular walls of the fruit pulp to release fluids from within the cellular walls. In another embodiment, the solid material are flowers, and disrupting the solid material includes releasing oils that are trapped within plant matter of the flowers. In one embodiment, the solid material is cannabis, and disrupting the solid material includes separating trichomes from plant matter and/or separating cannabis oils that are trapped within the plant matter from the plant matter. In another embodiment, the solid material is an inorganic material, and disrupting the solid material includes separating contamination or debris from the inorganic material.

Although several specific embodiments have been described above, the scope of the present disclosure is not limited to those embodiments, and persons of skill in the art will recognize that numerous variations are possible without departing from the scope of the appended claims.

The invention claimed is:

1. An apparatus for disrupting solid materials in a fluid medium, the apparatus comprising:
   a cylindrical fluid duct;
   a fluid inlet disposed on a first end of the fluid duct;
   a fluid outlet disposed on a second end of the fluid duct;
   a cylindrical acoustic projector concentric with the fluid duct and disposed inside the fluid duct, the acoustic projector comprising a plurality of hammer elements spaced apart from one another by a first plurality of slots in the acoustic projector; and
   an acoustic transducer coupled to the acoustic projector, wherein the hammer elements comprise an arm portion having a first thickness, and a head portion disposed at a distal end of the acoustic projector and having a second thickness that is greater than and protrudes outwards from the first thickness, and the acoustic projector has an asymmetrical shape in which the head portions are only disposed on a distal side of the projector.

2. The apparatus of claim 1, wherein the hammer elements extend along a longitudinal axis of the acoustic projector and are evenly spaced apart from one another by the first plurality of slots.

3. The apparatus of claim 2, wherein the first plurality of slots run from a distal end of the acoustic projector and terminate at a position between 50 and 20% of a total length of the acoustic projector from a proximal end of the acoustic projector.

4. The apparatus of claim 3, wherein the acoustic projector further comprises:
   a second plurality of slots that extend from the proximal end of the acoustic projector and partially overlap with the first plurality of slots.

5. The apparatus of claim 4, wherein the acoustic transducer is a cylindrical transducer that is disposed in a portion of the acoustic projector where the first plurality of slots overlap with the second plurality of slots.

6. The apparatus of claim 1, further comprising:
   a layer of elastic material disposed over the hammer elements and filling the first plurality of slots.

7. The apparatus of claim 1, wherein the hammer elements further comprise a transition portion that transitions between the first thickness and the second thickness.

8. The apparatus of claim 1, wherein the acoustic transducer is a cylindrical transducer that is compression fit within the cylindrical acoustic projector.

9. The apparatus of claim 8, further comprising:
   a compression band disposed over an outer diameter of the acoustic projector and compressing the acoustic transducer.

10. The apparatus of claim 1, further comprising a plurality of mass balance elements disposed on a proximal end of the acoustic projector and separated from one another by a second plurality of slots.

11. The apparatus of claim 10, wherein the acoustic transducer is disposed within the acoustic projector at a position where the first plurality of slots overlap with the second plurality of slots.

12. The apparatus of claim 10, wherein mass-lever arm products of the hammers are about the same as mass-lever arm products of the mass balance elements.

13. The apparatus of claim 1, further comprising an energy sensor disposed in the fluid duct and configured to sense energy caused by cavitations that are formed between the hammer elements and the fluid duct when the acoustic transducer is activated.

14. The apparatus of claim 1, wherein the hammer elements are configured to amplify acoustic energy from the acoustic transducer, and transmit the acoustic energy into a space between the hammer elements and inner walls of the fluid duct, thereby causing cavitations to occur in a portion of the fluid medium disposed in the space.

15. The apparatus of claim 1, wherein the hammer elements comprise beryllium copper and the fluid duct comprises a metal material.

16. An apparatus for disrupting organic materials disposed in a fluid medium, the apparatus comprising:
a cylindrical fluid duct;
a fluid inlet disposed on a first end of the fluid duct;
a fluid outlet disposed on a second end of the fluid duct;
a cylindrical acoustic projector concentric with the fluid duct and disposed inside the fluid duct, the acoustic projector comprising a plurality of hammer elements spaced apart from one another by a first plurality of slots that extend from a distal end of the acoustic projector;
a second plurality of slots that extend from a proximal end of the acoustic projector and partially overlap with the first plurality of slots; and
an acoustic transducer coupled to the acoustic projector and disposed in a portion of the acoustic projector where the first plurality of slots overlap with the second plurality of slots,
wherein the hammer elements have a first outer diameter where the first plurality of slots overlap with the second plurality of slots, and a second outer diameter at the distal end of the hammer elements, the second outer diameter being larger than the first outer diameter, and
wherein the acoustic projector has an asymmetric shape in which the hammer elements are only disposed on a distal side of the acoustic projector.

17. The apparatus of claim 16, further comprising a polymer material layer disposed over the hammer elements and covering the first plurality of slots.

18. The apparatus of claim 16, further comprising a plurality of mass balance elements separated from one another by the second plurality of slots and disposed on a proximal side of the acoustic projector.

19. An apparatus for causing cavitations within a fluid medium, the apparatus comprising:
a cylindrical fluid duct;
a fluid inlet disposed on a first end of the fluid duct;
a fluid outlet disposed on a second end of the fluid duct;
a cylindrical acoustic projector concentric with the fluid duct and disposed inside the fluid duct, the acoustic projector comprising a plurality of hammer elements spaced apart from one another by a first plurality of slots that extend from a distal end of the acoustic projector;
a second plurality of slots that extend from a proximal end of the acoustic projector and partially overlap with the first plurality of slots; and
a cylindrical acoustic transducer compression fit into the acoustic projector and disposed in a portion of the acoustic projector where the first plurality of slots overlap with the second plurality of slots,
wherein the hammer elements have a first outer diameter where the first plurality of slots overlap with the second plurality of slots, and a second outer diameter at the distal end of the hammer elements, the second outer diameter being larger than the first outer diameter, and
wherein the acoustic projector has an asymmetric shape in which the hammer elements are only disposed on a distal side of the acoustic projector.

* * * * *